(12) United States Patent
Therber et al.

(10) Patent No.: US 9,636,954 B2
(45) Date of Patent: May 2, 2017

(54) TIRE AIR PRESSURE MAINTENANCE DEVICE

(71) Applicant: Fleet Technologies LLC, Cleveland, OH (US)

(72) Inventors: Jeff Therber, Cleveland, OH (US); Clyde Stech, Lockhart, TX (US)

(73) Assignee: Servitech Industries, Inc., Nashville, TN (US)

( * ) Notice: Subject to any disclaimer, the term of this patent is extended or adjusted under 35 U.S.C. 154(b) by 633 days.

(21) Appl. No.: 13/841,290

(22) Filed: Mar. 15, 2013

(65) Prior Publication Data

US 2014/0261939 A1   Sep. 18, 2014

(51) Int. Cl.
*B60S 5/04* (2006.01)
*B60C 23/00* (2006.01)

(52) U.S. Cl.
CPC .................................. *B60C 23/003* (2013.01)

(58) Field of Classification Search
CPC ....... B60C 23/00; B60C 23/003; B60C 23/10; B60C 29/00
USPC ...... 152/415, 416, 417, 427; 137/224, 625.2
See application file for complete search history.

(56) References Cited

U.S. PATENT DOCUMENTS

| | | | |
|---|---|---|---|
| 3,101,572 A | 8/1963 | Stenger | |
| 3,102,573 A | 9/1963 | van Winsen et al. | |
| 4,387,931 A * | 6/1983 | Bland | B60C 23/007 152/416 |
| 4,418,737 A | 12/1983 | Goodell et al. | |
| 4,640,331 A | 2/1987 | Braun et al. | |
| 4,754,792 A | 7/1988 | Braun et al. | |
| 4,763,709 A | 8/1988 | Scholer | |
| 4,782,878 A | 11/1988 | Mittal | |
| 5,180,456 A | 1/1993 | Schultz et al. | |
| 5,287,906 A | 2/1994 | Stech | |
| 5,293,910 A * | 3/1994 | Mohs | B60S 5/043 137/224 |
| 5,327,346 A | 7/1994 | Goodell | |
| 5,465,772 A * | 11/1995 | Sartor | B60C 23/003 137/487.5 |
| 5,553,647 A | 9/1996 | Jaksic | |
| 5,629,873 A | 5/1997 | Mittal et al. | |
| 5,629,874 A | 5/1997 | Mittal | |
| 6,098,682 A | 8/2000 | Kis | |
| 6,144,295 A | 11/2000 | Adams et al. | |

(Continued)

FOREIGN PATENT DOCUMENTS

GB       2234801 A  * 10/1988
WO  WO2012/170721    12/2012

OTHER PUBLICATIONS

International Search Report and the Written Opinion of the International Searching Authority, PCT/US2014/028511, Fleet Technologies, Inc., Sep. 16, 2014.

*Primary Examiner* — S. Joseph Morano
*Assistant Examiner* — Jean Charleston
(74) *Attorney, Agent, or Firm* — Robert C. Klinger (57) ABSTRACT

A tire pressure maintenance device is shown and described. The tire pressure maintenance device may include a sensor mechanism configured to detect at least one predetermined condition of a vehicle. The tire pressure maintenance device may also include a control mechanism operatively coupled with the sensor mechanism, the control mechanism applying a predetermined pressure to a tire of the vehicle in response to the predetermined condition.

5 Claims, 4 Drawing Sheets

(56) References Cited

U.S. PATENT DOCUMENTS

| | | | |
|---|---|---|---|
| 6,212,464 B1 * | 4/2001 | Skotnikov | B60C 23/003 |
| | | | 701/71 |
| 6,401,743 B1 * | 6/2002 | Naedler | B60C 23/003 |
| | | | 137/224 |
| 6,425,427 B1 | 7/2002 | Stech | |
| 6,449,582 B1 | 9/2002 | Chaklader | |
| 6,561,017 B1 * | 5/2003 | Claussen | B60C 23/0408 |
| | | | 73/146 |
| 6,578,648 B2 | 6/2003 | Bell | |
| 6,594,566 B1 | 7/2003 | Skoff | |
| 6,758,088 B2 | 7/2004 | Claussen et al. | |
| 7,185,688 B2 | 3/2007 | Hayes et al. | |
| 7,273,082 B2 * | 9/2007 | White | B60C 23/003 |
| | | | 152/415 |
| 7,302,837 B2 | 12/2007 | Wendte | |
| 7,530,379 B1 * | 5/2009 | Becker | B60C 23/003 |
| | | | 152/415 |
| 8,136,561 B2 | 3/2012 | Sandoni et al. | |
| 9,132,704 B2 * | 9/2015 | Wilson | B60C 23/003 |
| 2003/0216845 A1 * | 11/2003 | Williston | B60C 23/0408 |
| | | | 701/36 |
| 2004/0173296 A1 * | 9/2004 | White | B60C 23/003 |
| | | | 152/417 |
| 2006/0174943 A1 * | 8/2006 | Alff | B60C 23/003 |
| | | | 137/224 |
| 2012/0059546 A1 | 3/2012 | Wilson et al. | |

\* cited by examiner

TIRE AIR PRESSURE MAINTENANCE DEVICE

FIELD OF INVENTION

The present invention relates generally to a tire inflation and deflation device and, more particularly, to an automatic tire air pressure maintenance device.

BACKGROUND

Automatic tire inflation systems (ATIS) have become a very popular tire maintenance tool in the heavy vehicle industry. For example, approximately one-third of new semi-trailers produced in the United States in 2012 were produced with an onboard ATIS. These systems have existed for over 20 years and are rapidly gaining acceptance and popularity.

However, a primary criticism of ATIS (as opposed to CTIS, which allow manipulation of tire pressures but are prohibitively costly for the commercial transport industry) is that they solve underinflation issues but do nothing to solve overinflation of tires. This failure to handle overinflation can negate some of the advantages that ATIS provides in the first place (reduced possibility of tire failure, reduced tire wear, even tire wear, increased fuel economy). A 2011 DOT study endorses ATIS as a tire maintenance solution but identifies overinflation as one of its two primary drawbacks.

Tires accumulate excess pressure during operation due to exposure to direct sunlight, increase in ambient temperature, friction from contact with the road, proximity to heat generated from brakes, etc. Commercially available ATIS technologies to date deliver a prescribed pressure to tires and prevent underinflation but they do not provide a means of pressure relief to solve this overinflation.

Commercial transport fleets have also identified overinflation as a problem that they would like solved. As a result of these fleet concerns and study criticisms ATIS providers have made significant efforts to develop pressure relieving mechanisms to add to their ATIS products.

It is commonly accepted in the heavy-duty vehicle industry that the ideal pressure for a semi-trailer tire varies by up to 20 psi between an empty state and a fully loaded state. As an example, a tire with prescribed cold pressure setting of 100 psi will perform optimally at that pressure with no payload, but at the same pressure and a payload of 40,000 lbs. it will have an increased footprint, thereby making more contact with the road, increasing tire fatigue and decreasing tire life. In order to maintain an optimal footprint, minimize tire fatigue and extend tire life, that tire under a full payload will require an additional +/−20 psi of pressure.

At the higher of these pressures however but in an empty state or without a payload, the tire serves as a more rigid conduit between the vehicle and the road and thereby creates significantly more stress on the vehicle's undercarriage— axles, suspension, etc. Simply put, for optimal vehicle and tire performance a typical semi-trailer desires approximately 20 psi greater tire pressure when loaded than when empty.

As another example, it is commonly accepted in the heavy-duty vehicle industry that when temporarily moving at low speeds and/or in off-road conditions it is desirable to have a lower tire pressure in order to create a greater footprint and improve traction, mobility and safety. Once again there can be a desirable pressure difference of approximately 20 psi between the cold highway pressure of a semi-trailer tire and the optimal soft terrain or off-road tire pressure.

Therefore, there is a need for a system that solves overinflation via some pressure relief mechanism. Moreover, there is a need for system that delivers a series of two or more prescribed pressures to tires based on certain predefined conditions, such as loaded or unloaded vehicle, highway or off-road terrain and the like. There is likewise a need for a system that delivers a pre-selected pressure to tires based on a certain condition, such as empty vehicle; another pre-selected pressure to tires based on a next condition such as loaded vehicle; yet another pre-selected pressure to tires based on a next condition such as soft or unstable terrain, and so on.

SUMMARY

A tire pressure maintenance device is shown and described. The tire pressure maintenance device may include a sensor mechanism configured to detect at least one predetermined condition of a vehicle. The tire pressure maintenance device may also include a control mechanism operatively coupled with the sensor mechanism, the control mechanism applying a predetermined pressure to a tire of the vehicle in response to the predetermined condition.

A tire pressure maintenance device may include a sensor mechanism configured to detect at least one predetermined condition of a vehicle, and a control mechanism coupled with the sensor mechanism, the control mechanism configured to apply a plurality pressures to a tire of the vehicle. The tire pressure maintenance device may also include a switch mechanism operably coupled to receive a signal from the sensor mechanism, where upon receipt of the signal the switch mechanism instructs the control mechanism to apply a predetermined pressure to the tire.

A tire pressure maintenance device may include a sensor operatively coupled with a vehicle, and a pressure control device operatively coupled with the sensor and at least one tire of the vehicle. The tire pressure maintenance device may also include a relief mechanism biased in an open position to allow inflation of the tire and calibrated to close to prevent deflation of the tires upon a predefined condition.

DESCRIPTION OF THE DRAWINGS

Operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
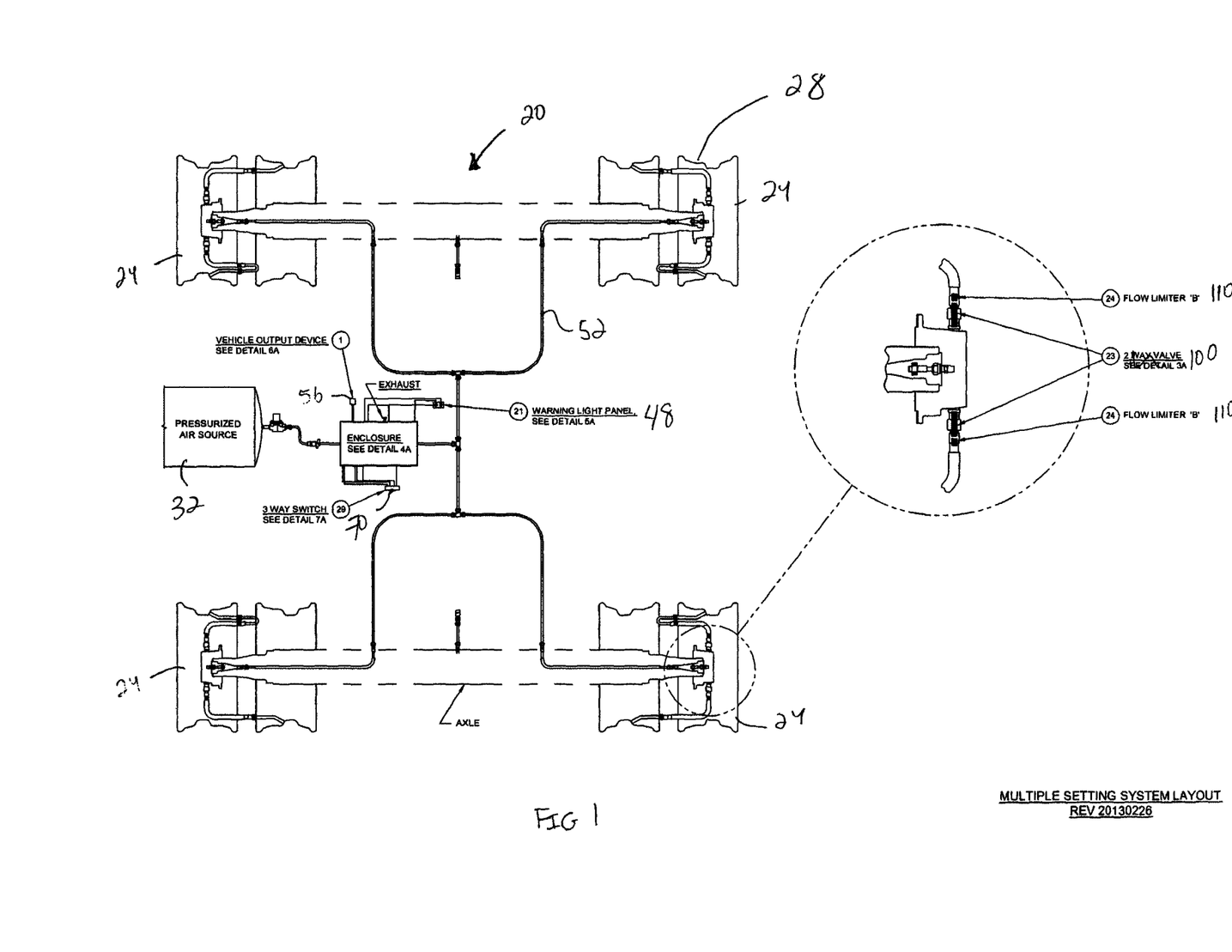
FIG. 1 is a plan view of a portion of the tire pressure maintenance device operatively secured with a vehicle.
Figure 2:
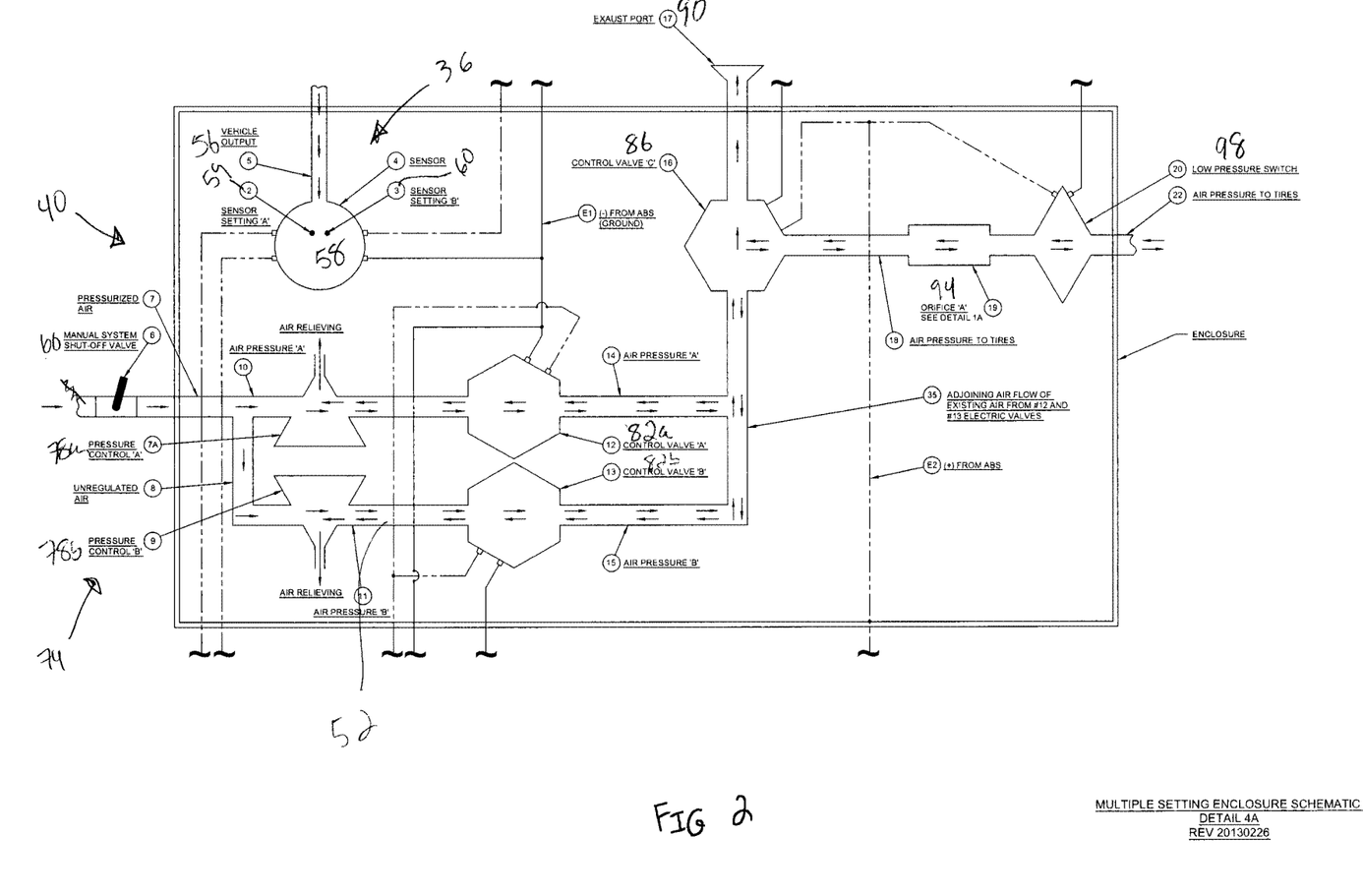
FIG. 2 is a schematic of a portion of the tire pressure maintenance device from FIG. 1.
Figure 3:
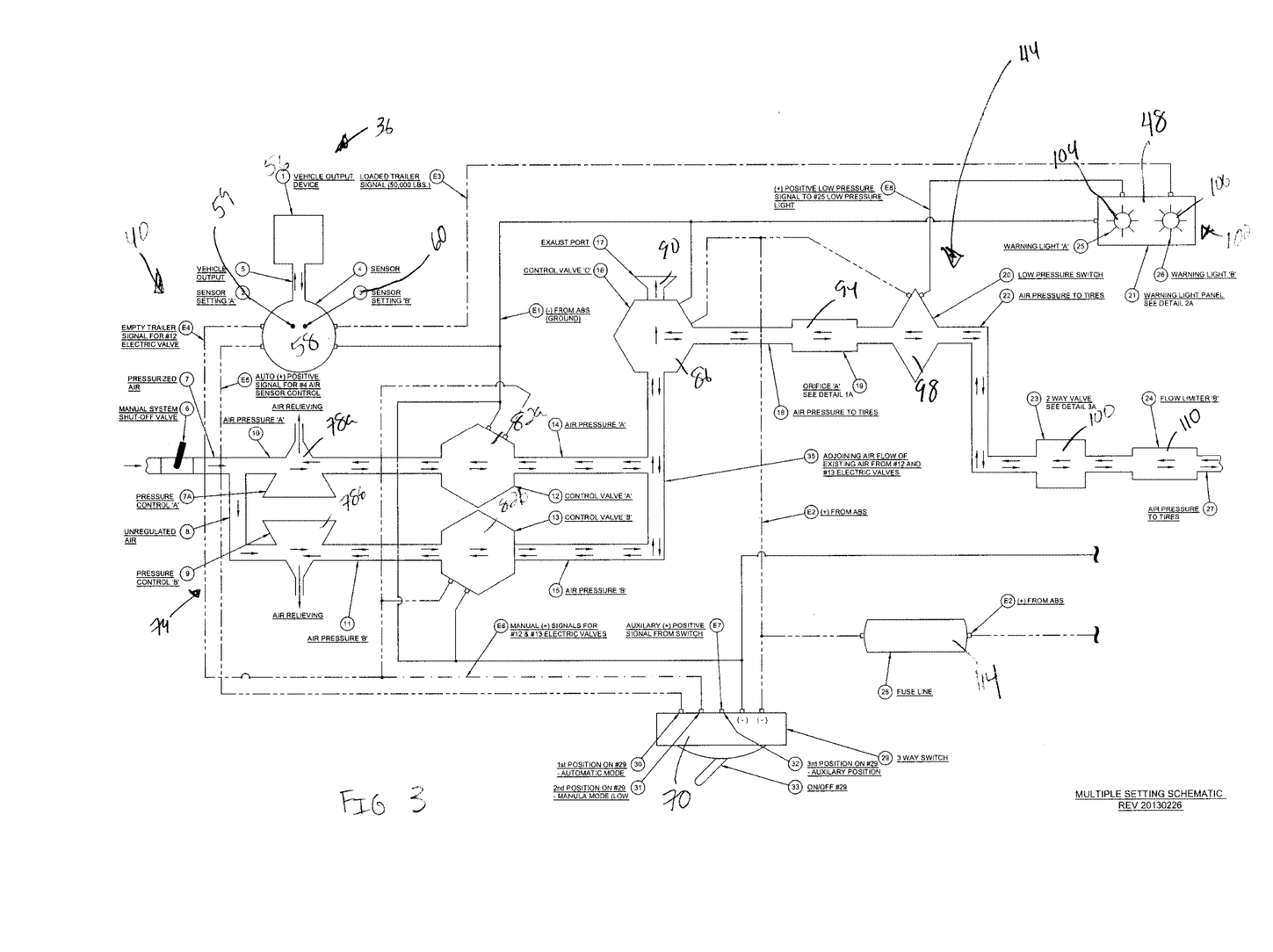
FIG. 3 is a schematic of the tire pressure maintenance device.

A tire pressure maintenance device 20 is shown in FIGS. 1-3. The tire pressure maintenance device 20 may be operatively coupled with at least one of a tire 24 of a vehicle 28, and by way of a non-limiting example, may be operatively attached with a plurality of tires 24 of the vehicle 28. Further, the tire pressure maintenance device 20 may be operatively coupled with all of the tires of the vehicle, or all or a predetermined number of the tires of a towed vehicle.

An air delivery system 32 may be operatively engaged with the tire pressure maintenance device 20 and at least one tire 24 of the vehicle 28. The air delivery system 32 may be part of the vehicle system, may be a separate system operatively attached with the tire pressure maintenance device 20, or may be a dedicated system that is part of the tire pressure maintenance device 20. The present teachings are not limited to either configuration. The air delivery system 32 may be of any appropriate configuration. By way of a non-limiting example, the air delivery system 32 may include the air brake reservoir of a trailer or vehicle, an auxiliary pump or an auxiliary compressor.

The tire pressure maintenance device 20 may be adapted to provide multiple pressure settings to the tires 24 of the vehicle 28. By way of a non-limiting example, the tire pressure maintenance device 20 may deliver a series of two or more prescribed pressures to the tires 24 based on certain pre-defined conditions described in more detail below. However, by way of a non-limiting example, these pre-defined conditions may include, without limitation a loaded vehicle, an unloaded vehicle, a vehicle on the highway or the vehicle being on off-road terrain, such as sand.

The tire pressure maintenance device 20 may include a sensor mechanism 36 operatively engaged with the vehicle 28. The sensor mechanism 36 may identify operative conditions of the vehicle 28 and may provide instruction to the tire pressure maintenance device 20 based upon such identified operative conditions. The tire pressure maintenance device 20 may use the operative conditions identified by the sensor mechanism 36 and may correspondingly act on the tires 24 of the vehicle 28.

The tire pressure maintenance device 20 may further include a control mechanism 40 that may lead to changing pressure delivered to the vehicle's tires 24 based upon certain inputs from the sensor mechanism 36. The tire pressure maintenance device 20 may also include a relief mechanism 44 operatively coupled to the tires 24. The tire pressure maintenance device 20 may also include a warning system 48 of any appropriate configuration that may inform the operator of vehicle conditions and actions or omission of actions by the tire pressure maintenance device 20 during operation, including, without limitation those conditions identified by the sensor mechanism 36.

As shown in FIG. 1, the tire pressure maintenance device 20 may be operatively coupled with the vehicle 28. The tire pressure maintenance device 20 may include a plurality of conduits 52, such as, tubes, hoses, or any other pneumatic coupling device operatively coupling the tire pressure maintenance device 20 with the tires 24. Any appropriate configuration may be used and the present teachings are not limited to that shown and described. By way of a non-limiting example, each tire 24 of the vehicle 28 may be operatively coupled with the tire pressure maintenance device 20 such that the tires 24 are all within a circuit of the tire pressure maintenance device 20, or each tire 24 may include a separate tire pressure maintenance device 20 or a combination of such. The interconnecting conduits 52 may be an existing system of the vehicle 28 or may be specific to the tire pressure maintenance device 20.

Once the tire pressure maintenance device 20 is operatively connected with the tires 24, the tire pressure maintenance device 20 may be pneumatically connected with the air delivery system 32, which may provide pressurized air. The tire pressure maintenance device 20 may further be operatively connected with a vehicle output system 56 as described in more detail below.

As represented in the FIG. 3, the warning system 48 may be operatively coupled with the tire pressure maintenance device 20. A portion of the warning system 48 may be positioned in an area of the vehicle 28 accessible to the operator, including, without limitation the cab, an exterior of the vehicle 28 or interior of the vehicle 28. The warning system 48 is described in more detail below.

A schematic representation of the tire pressure maintenance device 20 is shown in FIG. 3. As shown, the tire pressure maintenance device 20 may be operatively coupled with the vehicle output system 56 of any appropriate configuration, more specifically; the vehicle output system 56 may be operatively coupled with the sensor mechanism 36 of the tire pressure maintenance device 20. Any appropriate configuration of sensor mechanism 36 may be used. By way of a non-limiting example, the sensor mechanism 36 may employ a mechanical switch gauge 58 of any appropriate configuration or a pressure sensor. The mechanical switch gauge 58 may include adjustable contacts 59, 60 located at air pressure readings that may be associated with a vehicle's predetermined conditions. Any vehicle condition may be associated, including, without limitation, the vehicle 28 being loaded or empty. In such embodiments, when the mechanical switch gauge's needle makes contact with an adjustable contact, an electrical circuit may be established. A corresponding signal may then be sent through the switch gauge 58 to advise that a specific condition has been met and that a different pressure should be delivered downstream via the tire pressure maintenance device 20 to the vehicle's tires 24.

In some embodiments, the sensor mechanism 36 may also be set or programmed to register an input associated with a specific vehicle condition such as the vehicle or a trailer associated therewith being empty or fully loaded to a maximum weight. The sensor mechanism 36 may also advise the operator accordingly via an output of any appropriate configuration, including, without limitation the warning system 48. By way of a non-limiting example, the output may include an electrical signal, a warning light or both, which may be positioned within the cab, an exterior portion of the vehicle, an interior compartment of the vehicle 28, or any other operator accessible position. In such embodiments, the sensor mechanism 36 may be calibrated to register a pressure that corresponds with a maximum weight and may be connected to the warning system 48 that advises the operator when the vehicle 28 has reached that weight. This may aid in prevention of unwanted conditions, such as overloading and the wear and tear, fines, etc. associated with it.

The sensor mechanism 36 may accept "conditions" data from one of a variety of vehicle outputs informing the control mechanism 40 accordingly. In some embodiments, the vehicle output may include air springs on the vehicle's suspension. Pressure in the air spring may increase when the vehicle 28 goes from an empty to loaded condition. The sensor mechanism 36 may be operatively connected directly to the air spring to detect such increase. Other embodiments of the vehicle output may include air shock absorbers on the vehicle's suspension. Pressure in the air shock absorber may increase when the vehicle 28 goes from an empty to loaded condition. The sensor mechanism 36 may be operatively connected directly to the air shock absorber to detect that increase. In yet other embodiments, the vehicle output system 56 may include an auxiliary pneumatic device mounted on the vehicle 28 such as an air spring or air shock absorber that may be compressed when the vehicle is loaded. Similar to the embodiments above, pressure may increase when the vehicle 28 goes from an empty to a loaded condition. The sensor mechanism 36 may be operatively connected directly to the auxiliary pneumatic device to detect that increase.

In still yet other embodiments, the vehicle output system 56 may arise from one or more of the vehicle's tires 24. The pressure within such tire or tires 24 may increase when the vehicle 28 goes from an empty to loaded condition. The sensor mechanism 36 may be operatively coupled with a tire pressure gauge or a tire pressure sensor mechanism to detect or measure any such increase. In other embodiments, the vehicle output system 56 may include an onboard scale such as a strain gauge or load cell device. The sensor mechanism 36 may be connected electrically to the scale and measure current. In other embodiments, an auxiliary device such as a pressure transducer configured to measure air pressure from one of a variety of vehicle output systems 56 may deliver the applicable electrical signal accordingly. The sensor mechanism 36 may receive and forward the electrical signal from the auxiliary device. Still further, the sensor mechanism 36 may be operably coupled via an electrical circuit to the vehicle output system 56 such that it may register an electrical current generated by the output. While various embodiments of the vehicle output systems 56 are described, the descriptions are not exhaustive. Any appropriate configuration of vehicle output system 56 may be used.

As shown in FIG. 3, the sensor mechanism 36 may be operatively coupled via a pneumatic circuit to the vehicle output system 56, such as by way of a non-limiting example, to any one or more of the vehicle output systems described above. The sensor mechanism 36 may be calibrated to detect if a pre-defined condition is being met, such as described above. By way of a non-limiting example, the pre-defined condition may include, without limitation an air pressure detected from the vehicle output system 56 that corresponds to the vehicle's loaded or empty condition. This may be accomplished through the vehicle output system 56, such as without limitation a trailer's air suspension spring, auxiliary mounted device, or onboard scale as described above.

The vehicle output system 56 may be operatively coupled with the sensor mechanism 36. The vehicle output system 56 may communicate to the sensor mechanism 36 certain conditions, such as by way of a non-limiting example pressurized air from a trailer's air suspension spring or auxiliary mounted device, or electrical current from an onboard scale or load cell. The sensor mechanism 36 may include a first setting. In the first setting, sensor mechanism 36 will request to change pressure controls, from a first pressure control to a second pressure control, such as when the vehicle 28 goes from loaded to unloaded condition. The sensor mechanism 36 may also or alternatively include a second sensor setting. In this embodiment, the sensor mechanism 36 may not request the switch to change pressure controls, but may send an electrical signal to illuminate the "fully loaded" warning light of the warning system 48.

In some embodiments, the control mechanism 40 may include an electric switch 70 of any appropriate configuration. The electric switch 70 may include a plurality of positions, including, without limitation at least three positions. A first position may be for manual override while second and third positions may be for each tire pressure setting, i.e., low and high pressure. The control mechanism 40 may also include a pressure control 74 for each pressure setting, calibrated to deliver prescribed pressures for various conditions such as loaded/empty, etc. The control mechanism 40 may be in any position on the vehicle or in proximity thereto such that the operator may access it.

Downstream of the sensor mechanism 36 may be the pressure control system 74. The pressure control system 74 may be of any appropriate configuration. By way of a non-limiting example, the pressure control system 74 may include an electronic or mechanical pressure regulator 78 of any appropriate configuration. As shown in FIG. 3, the pressure control system 74 may include a pair of pressure regulators 78a, 78b; provided, however, that any appropriate number of pressure regulators may be used without departing from the present teachings. By way of a non-limiting example, three, four, five etc. pressure regulators 78 may be used. In some embodiments, the total number of pressure regulators 78 may generally match the total number of desired pressure settings.

A first pressure regulator 78a may be a high pressure or high regulated air regulator and a second of the pressure regulators 78b may be a low pressure regulator or a low regulated air regulator. Further, one of the regulators 78a, 78b may be a relieving regulator, i.e., it may purge air from the automatic air pressure maintenance device 20 in accordance with the present teachings. By way of a non-limiting example, the low pressure regulator 78b may function as the relieving regulator. The pressurized air may be provided from the vehicle's air supply 32. High regulated air may come from first pressure regulator 78a, which in these exemplary embodiments may be the default pressure control. An unregulated air supply may be provided. The air may be substantially the same pressure as that from the air source 32. Low regulated air supply may be come from the second of the pressure regulators 78b.

The control mechanism 40 may further include a pair of control valves 82 dedicated to and downstream of each one of the pressure regulators 78, i.e., each one of the control valves 82 may be operatively coupled to at least one of the regulators 78. Any appropriate number of control valves 82 may be used without departing from the present teachings. By way of a non-limiting example, three, four, five etc. control valves 82 may be used. In some embodiments, the total number of control valves 82 may generally match the total number of pressure settings desired.

In some embodiments, any one of the control valves 82 may open when its corresponding regulator 78 is the active regulator as instructed by the sensor mechanism 36, and by way of a non-limiting example, the switch gauge 58. The control valves 82 may also close when its corresponding regulator 78 is not the active regulator. When either of the control valves 82 is in the open position, it may allow air at a predetermined pressure to pass through the conduits 52 operatively positioned downstream and into the rest of the automatic air pressure maintenance device 20. The control valves 82 may be of any appropriate construction and configuration. By way of a non-limiting example, the control valves 82 may be electric valves, such as electric solenoid valves. However, the present teachings are not limited to this configuration. Further, the control valves 82 may be of a substantially similar construction or may be different. As shown in FIG. 3, the control valve 82*a* may be in a default home position open and the control valve 82*b* may be in a default home position closed. However, the present teachings are not limited to this construction; e.g., the default positions may be reversed.

By way of a non-limiting example, control valve 82*a* may be a solenoid valve configured in a normally open position. The solenoid valve 82*a* may include a two-port electric solenoid in a normally open position that may provide air downstream when the control valve 82*a* is in an active pressure control device. The control valve 82*b* may be a solenoid valve configured in a normally closed position. The solenoid valve 82*b* may include a two-port electric solenoid in a normally closed position that may provide air downstream when the switching gauge 58 activates the control valve 82*b*. Air flow may exit from the control valve 82*a* at the first pressure. Air flow may exit from the control valve 82*b* at the second pressure. In some embodiments, the first and second pressure may be different.

The automatic air pressure maintenance device 20 may include a downstream control valve 86, which may be downstream of the control valves 78*a*, 78*b*. Specifically, the automatic air pressure maintenance device 20 may include the downstream control valve 86 located downstream of all dedicated control valves 78 regardless of the number of control valves 78 used. The downstream control valve 86 may be configured to exhaust air to atmosphere when power to the automatic air pressure maintenance device 20 is turned off or is otherwise lost. The downstream control valve 86 may create a large enough difference in pressure to close a two-way valve 100 at each tire 24 and may trap air in the tires 24, as described in more detail below. The downstream control valve 86 may be of any appropriate configuration.

By way of a non-limiting example, air may be exhausted through an exhaust port 90 of the downstream control valve 86 to atmosphere. The downstream control valve 86 may include a three-port electric solenoid valve, which may be normally open downstream and closed to atmosphere. This downstream control valve 86 may provide air downstream when the pressure control is active and may exhaust to atmosphere when power is lost. The exhaust port 90 may be coupled with the downstream control valve 86 or may be integrally formed therewith. The exhaust port 90 may open to atmosphere when power from the vehicle's power supply is lost, thereby dropping line pressure lower than tire pressure sufficiently to close the two-way valves 100 in each tire 24 as described in more detail below.

The automatic air pressure maintenance device 20 may include a flow limiter 94, such as an orifice, downstream of the downstream control valve 86. The flow limiter 94 may limit flow of air in each direction so that inflating and relieving may generally take place at the same rate. This may ensure that the two-way valves 100 at each tire may remain open during normal operation. The flow limiter 94 may be of any appropriate configuration. It should be understood that the present teachings are not limited to the orifices shown.

Further, a condition detector 98 may be operably coupled downstream of the flow limiter 94. The condition detector 98 may provide a warning to the operator of a predefined condition, including, without limitation that the pressure within the automatic air pressure maintenance device 20 has dropped below a predetermined level. An indicator 102 may be electrically connected with the condition detector 98. The indicator 102 may include any appropriate configuration, including, without limitation being a series of one or more warning lights such as dual LED lights, to advise the operator of predefined conditions, including, without limitation low line pressure or specific loading condition, for example maximum weight attained. By way of a non-limiting example, the condition detector 98 may include a low pressure switch and the indicator 102 may include a low pressure indicator 104, such as an LED and a loaded trailer indicator 106, such as an LED. The low pressure indicator 104 may illuminate when line pressure drops to the pressure setting of the low pressure switch 98. The loaded trailer indicator 106 may illuminate when the low pressure switch 98 detects a pressure that may correspond to a specific vehicle condition such as maximum weight attained.

While a single condition detector 98 is shown and described, the tire pressure maintenance device 20 may include any appropriate number of condition detectors 98. By way of a non-limiting example, the tire pressure maintenance device 20 may include as many number of condition detectors 98 as there are tires 24 operatively engaged with the tire pressure maintenance device 20.

By way of a non-limiting example, should the pressure on either side of the low pressure switch 98 drop below the pre-set level (usually 10-20 psi lower than the lowest pressure control pressure setting) the low pressure switch 98 may send a current to the low pressure warning light 102 telling the operator that there could be a significant air leak somewhere in the automatic air pressure maintenance device 20.

The automatic air pressure maintenance device 20 may include the relief mechanism 44. The relief mechanism 44 may be configured to relieve pressure from the tire 24 as well as deliver pressure to the tire 24. The relief mechanism 44 may include at least one of the two-way valves 100. The two-way valves 100 may be positioned at each tire 24. The relief mechanism 44 may include a flow limiter 110, such as by way of a non-limiting example an orifice, to limit flow at each tire 24. In such embodiments, the two-way valves 100 may be biased in an open position but may be designed to close when the downstream (tire) pressure exceeds the upstream (line) pressure by more than a pre-set level, usually 3-5 psi. As long as the change in pressure is less than the 3-5 psi pre-set level, the two-way valve 100 may remain open and may allow air to pass freely in both directions through the two-way valve 100.

The flow limiters 110, such as by way of a non-limiting example, orifices, at each tire 24 may be placed downstream of each two-way valve 100 such that, given their presence on the opposite side of the two-way valve 100 from the flow limiter 94, air may not flow at a greater rate in either direction. The change in pressure does not increase to a level that would close the two-way valve 100, i.e., the flow limiter 110 generally prevents the two-way valve 100 from closing due to the pressure created by the flow of air through the tire pressure maintenance device 20. The downstream control valve 86 may exhaust line pressure to atmosphere when the system loses power. This may ensure that the change in pressure upstream and downstream of the two-way valves 100 may be greater than the 3-5 psi required to keep the valves open. This may, therefore, close the two-way valves 100 until power and line pressure are restored.

Figure 4:
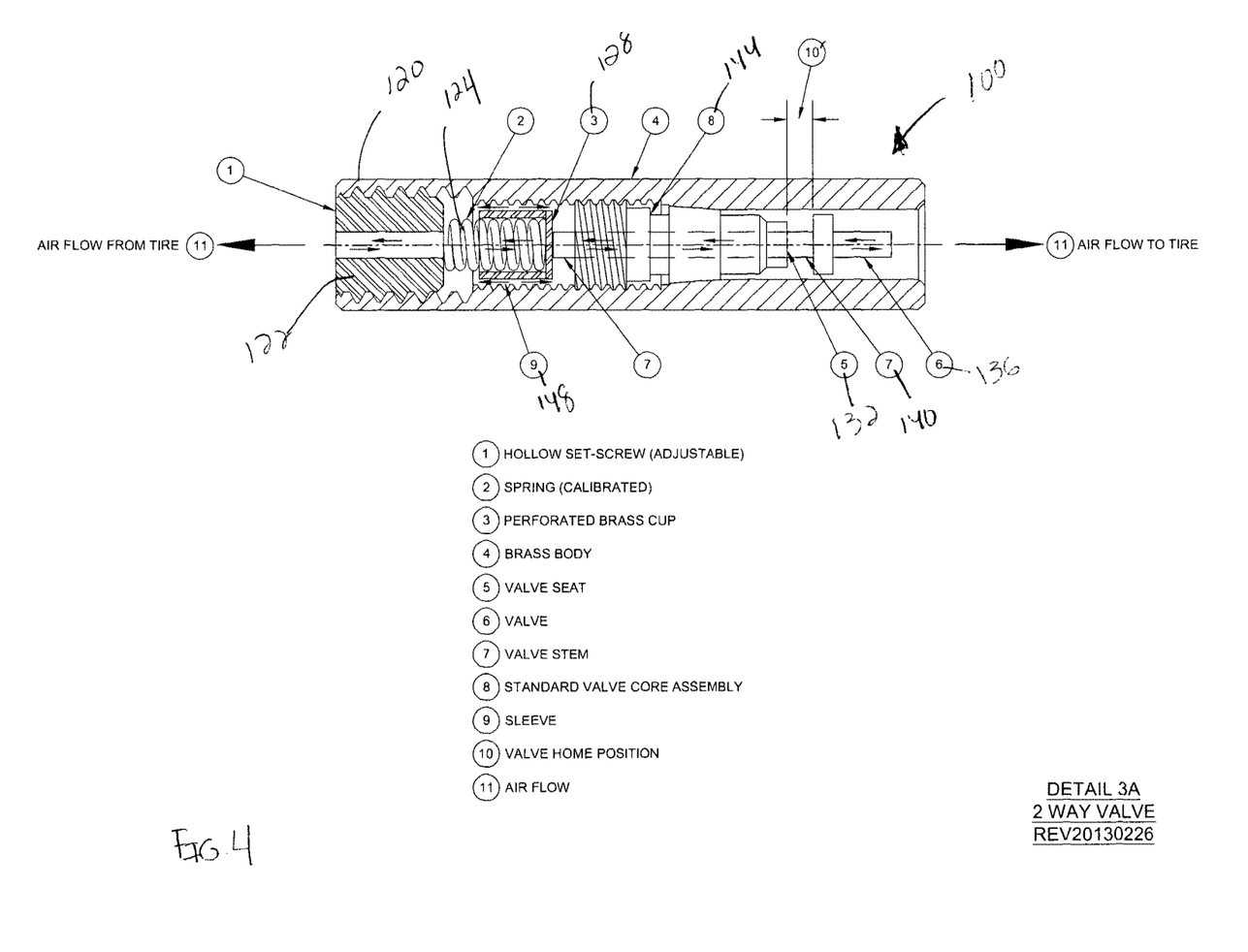
FIG. 4 is a cross-sectional view of a valve of the tire pressure maintenance device.

The two-way valve 100 may be positioned downstream from the condition detector 98 within the automatic air pressure maintenance device 20. The two-way valve 100 may be located at each tire, biased open, spring-loaded, spring calibrated to close the valve when tire pressure exceeds line pressure by a pre-set amount, such as 3-5 psi. The two-way valve 100, however, may be of any appropriate configuration, including, without limitation a springless or biasingless valve. In some embodiments, the valve may be as shown in FIG. 4.

In such embodiments the two-way valve 100 may be configured to allow air to flow in two directions through it. The two-way valve 100 may include a body 120 of any appropriate construction and configuration. The body 120 may be of a generally compact size such that it may be efficiently attached with the automatic air pressure maintenance device 20. The body 120 may be made of any appropriate material, including, without limitation of brass.

The two-way valve 100 may include a hollow set screw 122 that may be adjustably positioned within the body 120. The two-way valve 100 may also include a biasing member 124 operatively positioned within the body 120 and in operative communication with the set screw 122. The biasing member 124 may be calibrated such that it may bias upon application of a predetermined amount of force. The set-screw 122 may be configured to adjust its relative position within the body 120. Adjusting the position of the set-screw 122 may adjust calibration of the biasing member 124. By way of a non-limiting example, the biasing member 124 may include a coil spring. As shown in FIG. 4, the biasing member 124 may be in a home position. In the home position, the biasing member 124 generally retains the two-way valve 100 in an open position. If the pressure exceeds the predetermined amount of force of the biasing member 124, the biasing member 124 may travel transversely within the body 120. This may then close the two-way valve 100 and may generally prevent air from escaping from the two-way valve 100 and going back upstream the tire pressure maintenance device 20. This may generally prevent the tires 24 from deflating when power is lost to the tire pressure maintenance device 20 or there is a leak therein.

The two-way valve 100 may include a perforated cup 128, such as a perforated brass cup 128. The perforated cup 128 may be positioned within the body 120 and may be operatively engaged with the biasing member 124 as shown in FIG. 4.

The two-way valve 100 may also include a valve seat 132 of any appropriate configuration. The valve seat 132 may be positioned within the body 120 and may extend a portion of a length of the body 124 to assist with the flow of air through the two-way valve 100. A valve stem 140 may be attached with the valve 136. The valve stem 140 may be of any appropriate configuration. By way of a non-limiting example, the valve stem 140 may of a construction to operatively engage with the valve stem of a tire.

The two-way valve 100 may include a valve core assembly 144. The valve core assembly 144 may be of any appropriate configuration. By way of a non-limiting example, the valve core assembly 144 may be of a standard construction. The valve core assembly 144 may be configured as a Schrader valve that may be operatively secured to most standard valves.

A sleeve 148 may be positioned within the body 120. The sleeve 148 may generally circumscribe at least a portion of the biasing member 124 and perforated cup 128. The sleeve 148 may generally protect the biasing member 124 and perforated cup 128 and may retain the operative position of such within the body 120.

The automatic air pressure maintenance device 20 may further include a fuse line 114 operatively securing the automatic air pressure maintenance device 20 with the fuse box of the vehicle 28. This may permit the automatic air pressure maintenance device 20 to be operatively secured with the electrical system of the vehicle 28. This may provide any electrical power that may be required for the automatic air pressure maintenance device 20 to operate as indicated herein.

As an additional safety and performance feature of the automatic air pressure maintenance device 20, the warning system 48 may be included. The warning system 48 may include lights that may be operatively connected to the automatic air pressure maintenance device 20 and mounted at a location on the vehicle 28 that may be highly visible to its operator. These lights may illuminate to inform the operator of certain defined conditions of the vehicle 28. In an embodiment, the lights may illuminate when the vehicle's "loaded" condition has been achieved. When the sensor mechanism 36 detects that a loaded condition has been met it may inform the operator so he can stop loading. This feature may prevent overloading, avoiding excess wear on the vehicle and its tires and may reduce the possibility of costly overweight penalties. Further, if desired, one of the sensor mechanism's pressure settings may be calibrated to the maximum gross vehicle weight to inform the operator that he now has a maximum load. In another embodiment, the lights may illuminate when the line pressure of the automatic air pressure maintenance device 20 has dropped to a predetermined level such that the operator should stop and check the system for an air leak and, if necessary, turn off the system at the manual system shutoff, such as the manual override 66.

In operation, the automatic air pressure maintenance device 20 may be operatively secured to any appropriate vehicle 28. The automatic air pressure maintenance device 20 may secure with the electrical system of the vehicle 28 and the air delivery system 32. The manner of securement is not limited in the present teachings. Any appropriate manner may be used. Once operatively attached, the automatic air pressure maintenance device 20 may be operated. The automatic air pressure maintenance device 20 may provide a predetermined air pressure to the tires 24 of the vehicle 28. The predetermine air pressure may be based upon certain conditions of the vehicle 28. The automatic air pressure maintenance device 20 may detect the condition and adjust the air pressure of the tires accordingly.

Specifically, the automatic air pressure maintenance device 20 may provide a plurality of pressure settings. By way of a non-limiting example, the automatic air pressure maintenance device 20 may provide at least two pressure settings, a high pressure setting and a low pressure setting. The automatic air pressure maintenance device 20 may include the sensor mechanism 36 such that it may detect a predetermined or a plurality of predetermined conditions of the vehicle. The sensor mechanism 36 may be configured to provide this information via instruction to the control mechanism 40. The control mechanism 40 may then provide air supply from one of a plurality of calibrated sources to the tires.

The control mechanism 40 may direct the air from the air delivery system 32. It may allow air to pass in two directions along the automatic air pressure maintenance device 20. The air moving in both directions may facilitate relieving and exhausting air to atmosphere to generally prevent air loss from the tires 24 when the automatic air pressure maintenance device 20 loses power.

The two-way valve 100 may facilitate both inflation and deflation of the tires 24. The two-way valve 100 may be set to a generally open position such that air may pass through the two-way valve 100 to the tires and from the tires as applicable. For example, the air may pass in either direction from the two-way valve 100 to either increase or decrease tire pressure based upon the identified conditions noted above. However, if the automatic air pressure maintenance device 20 loses power, the pressure upstream of the two-way valve 100 may become less than the pressure within the tires 24 causing the biasing member 124 of the two-way valve 100 to move. As the pressure changes, this pressure difference may overcome the biasing of the biasing member 124 and the two-way valve 100 may close. Closing of the two-way valve 100 may generally prevent air from escaping from the tires 24, which may generally prevent deflation of the tires 24.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A tire pressure maintenance device comprising:
a sensor mechanism configured to detect at least one predetermined condition of a vehicle; and
a control mechanism responsive to the sensor mechanism, the control mechanism configured to apply a predetermined pressure to a tire of the vehicle, wherein the control mechanism includes a two-way valve configured to allow air to flow into and out of the tire through the two-way valve, wherein the two-way valve is configured to be in the open position when the predetermined pressure applied to the tire equals the pressure in the tire such that air can flow in both directions through the open two-way valve;
wherein the two-way valve is configured to close when the pressure in the tire exceeds a pressure applied to the two-way valve by a predetermined amount such that air is restricted from flowing through the two-way valve; and
wherein the two-way valve includes a biasing member configured to keep the two-way valve open until the pressure in the tire exceeds the pressure applied to the two-way valve by a predetermined amount.

2. The tire pressure maintenance device of claim 1, wherein the sensor mechanism includes a switch mechanism, whereby the switch mechanism is configured to apply a signal to the control mechanism to apply the predetermined pressure to the tire.

3. The tire pressure maintenance device of claim 1, further comprising a switch mechanism responsive to the sensor mechanism and the control mechanism, wherein the sensor mechanism is configured to instruct the switch mechanism to apply a signal to the control mechanism to instruct the control mechanism to apply the predetermined pressure to the tire.

4. The tire pressure maintenance device of claim 1, wherein the predetermined amount is a function of a loaded condition of the vehicle.

5. The tire pressure maintenance device of claim 1, wherein the biasing member is configured to he selectively positioned to selectively establish the predetermined amount.

\* \* \* \* \*